United States Patent
Poling et al.

[11] Patent Number: 5,974,819
[45] Date of Patent: Nov. 2, 1999

[54] REFRIGERATION THERMOSTAT WITH CONTROLLED PRESSURE EQUALIZATION

[75] Inventors: Ronald W. Poling, Morrison; Manuel L. Gonzalez, Sterling; Kenneth R. Renkes, Morrison, all of Ill.

[73] Assignee: General Electric Company, Schenectady, N.Y.

[21] Appl. No.: 08/956,775

[22] Filed: Oct. 21, 1997

[51] Int. Cl.⁶ ........................................... F25D 23/12
[52] U.S. Cl. ................. 62/263; 236/91 A; 337/328; 62/187
[58] Field of Search ................. 62/187, 229, 259.1, 62/263; 337/327, 328; 236/91 A

[56] References Cited

U.S. PATENT DOCUMENTS 4,041,433   8/1977   Watson ................................. 337/328 X
4,824,013   4/1989   Gouldey ................................. 236/78 R Primary Examiner—Henry Bennett
Assistant Examiner—Susanne C. Tinker
Attorney, Agent, or Firm—Welsh & Katz, Ltd.; Wayne O. Traynham

[57]   ABSTRACT

A refrigeration apparatus containing a thermostat, adapted for use in a food storage compartment potentially containing a flammable gas, includes a thermostat and an enclosure forming a chamber configured to house the thermostat. The enclosure has two umbrella-type check valves configured to permit gas to pass into the chamber or out of the chamber when a predetermined pressure differential exists between the chamber and the food storage compartment. The enclosure forms a seal with the thermostat so that gas only passes through the check valves.

14 Claims, 2 Drawing Sheets

REFRIGERATION THERMOSTAT WITH CONTROLLED PRESSURE EQUALIZATION

FIELD OF THE INVENTION

The present invention relates generally to a refrigeration apparatus and ore specifically to a refrigeration thermostat assembly configured to regulate the passage of gas through the thermostat enclosure.

BACKGROUND OF THE INVENTION

Thermostats typically used in refrigerators have electrical contacts that "make" and "break" contact to complete an electrical circuit to energize the refrigerator compressor motor or power relay. There may be a small arc or spark produced by the thermostat contacts by this process. This is not a problem in refrigerators that use FREON or other non-explosive refrigeration gasses. However, some countries are presently moving in a direction to use propane, butane, or other hydrocarbon-based gas in lieu of FREON for a variety of reasons.

One such reason to eliminate the use of FREON gas is that FREON gas is a chloroflurocarbon-type gas (CFCs) and is known to be detrimental to the environment. Public pressure and governmental regulations have been increasing the demand on industry to use "environmentally-friendly" products. As a consequence, refrigeration appliances have been developed in which the refrigerant fluid is made up of gases or a mixture of gases that do not significantly impact the environment adversely. However, such relatively environmentally friendly gases, such as propane and butane, have the undesirable characteristic of being flammable.

In refrigeration systems using such combustible gases, some of the gas could be present in the closed food storage compartment where the thermostat assembly is located. This may pose a risk of explosion if the gas is ignited. Depending upon the propane or butane to oxygen ratio, a spark produced within the thermostat could cause ignition of the gases within the refrigeration compartment. Such a situation is dangerous and unacceptable. Additionally, various safety specifications, such as IEC 79-15, dictate that certain precautions must be taken and that certain design criteria must be followed when explosive gasses may be present.

In specifying temperature settings for vapor operated refrigeration thermostats, it is known to include a standard barometric pressure at which the specified temperatures apply. When performing actual temperature setting measurements, the actual barometric pressure is also measured, and the temperature settings are corrected to the specified standard barometric pressure.

When the thermostat mechanism is placed inside a sealed enclosure, measurement of the pressure inside the sealed enclosure is no longer possible. Thus, measurement of the setting temperatures now vary as a result of variation in atmospheric pressure at the time that the enclosure was sealed, and also vary as a result of measuring the temperature settings of the thermostat having a body temperature different than the body temperature at the time of sealing. The result is an apparent increase in setting temperature variation and different mean setting temperatures. This causes temperature setting measurement correlation problems between the thermostat manufacturer and the customer which incorporates the thermostat into a refrigeration unit.

SUMMARY OF THE INVENTION

It is therefore desirable to provide a refrigeration thermostat that can be safely used in refrigeration systems using combustible gasses. It is also necessary to comply with applicable safety specifications, such as IEC 79-15. The above-described problems are solved by placing the thermostat in a semi-sealed housing that vents gas into and out of the thermostat housing in a controlled manner. The thermostat housing includes two umbrella check valves that permit gas, such as air, propane, or butane, to enter and exit the thermostat housing in a controlled manner and according to the IEC specification. The umbrella check valves will only actuate at predetermined pressure differentials.

It is assumed that a small amount of combustible gas may be present within the refrigeration compartment. Depending upon the relative temperature of the thermostat mechanism and the refrigerator compartment, a pressure differential between the thermostat mechanism and the refrigerator compartment may exist. This means that potentially combustible gas may flow from the refrigerator compartment into the thermostat housing, or may flow from the thermostat housing back into the refrigerator compartment.

The present refrigerator thermostat assembly prevents any possible spark generated by the electrical contacts of the thermostat mechanism from coming into contact with the explosive gas mixture that may be present in the refrigerator compartment. Should a spark occur while some small amount of explosive gas is present within the thermostat housing, only a very small ignition will occur. Further, the spark generated is contained within the housing and can not ignite the greater amount of gas that may be present in the refrigeration compartment. Additionally, the umbrella check valves permit gas to vent into and out of the thermostat housing such that the internal pressure within the thermostat housing remains equal to or relatively equal to the pressure within the refrigeration compartment. The most significant venting will occur when the refrigerator is first activated. In this situation, the thermostat will change in temperature from ambient room temperature to the desired setting temperature for the normal operation of the refrigerator, which is typically about five degrees centigrade. Venting from inside the thermostat enclosure into the refrigerator food storage compartment will take place when the refrigerator is removed from service and is returned to ambient temperature. This results in accurate calibration of the thermostat resulting in desired temperature control.

More specifically, the refrigerator thermostat assembly includes a thermostat and an enclosure forming a chamber configured to house the thermostat mechanism. The enclosure has at least one check valve configured to permit gas to pass into the chamber when a predetermined pressure differential exists between the chamber and the food storage compartment. Two umbrella-type check valves may be included. Accordingly, the check valves permit gas to pass into the chamber or out of the chamber. The enclosure forms a seal with the thermostat mechanism so that gas only passes through the check valves. Other features and advantages of the invention will become apparent from the description that follows.

DETAILED DESCRIPTION OF THE INVENTION

Figure 1:
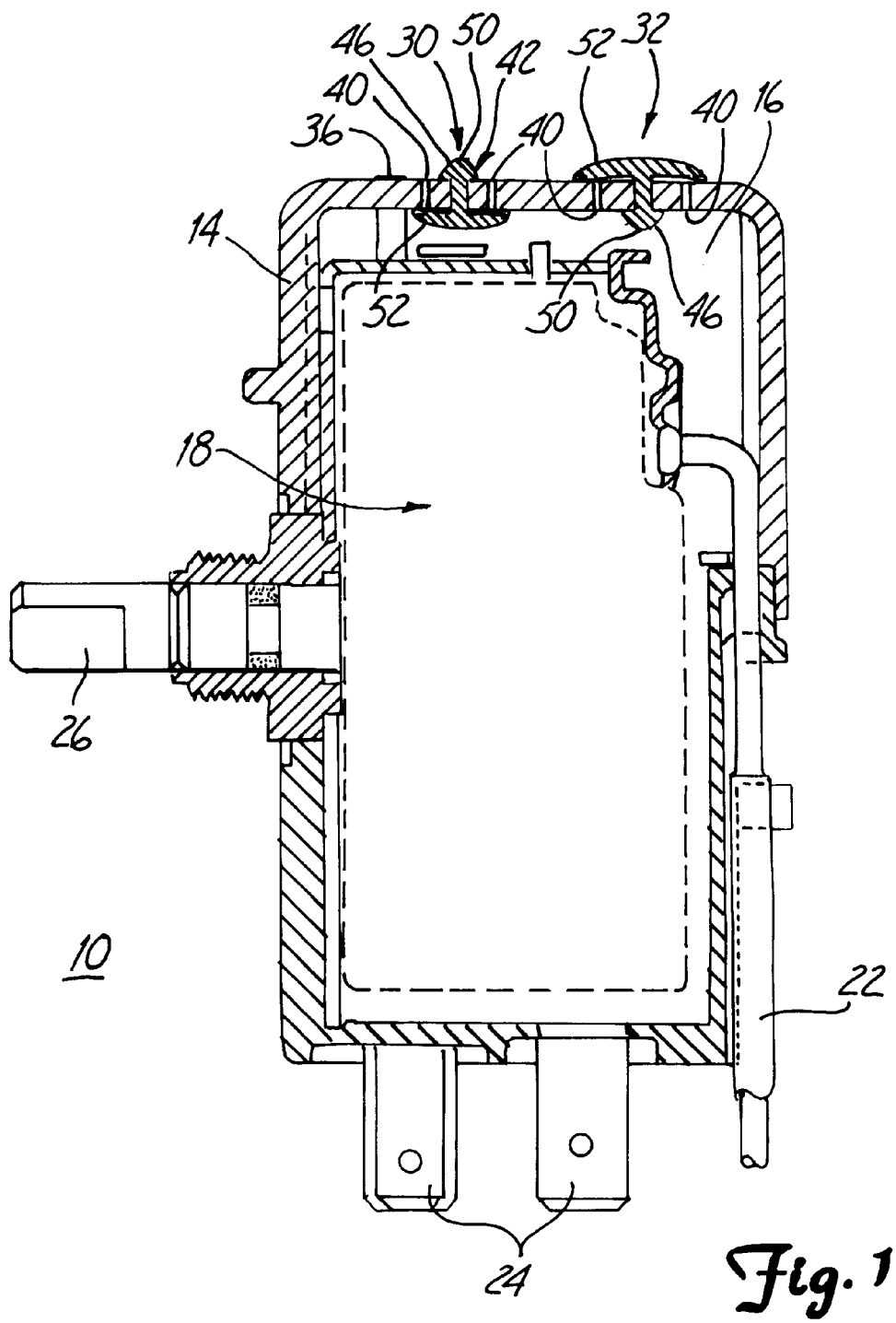
FIG. 1 is a side sectional view of a specific embodiment of a thermostat mechanism housed within an enclosure.

Referring now to FIG. 1, a refrigeration thermostat assembly 10 is shown generally. The refrigeration thermostat assembly 10 includes a rigid enclosure 14 forming a chamber 16 configured to house a thermostat mechanism 18, as shown in dashed lines. The thermostat mechanism 18 is a conventional, commercially available thermostat mechanism, as is known in the art. Details regarding the known thermostat mechanism 18 are omitted for purposes of clarity. The thermostat mechanism 18 typically includes a capillary tube 22 extending away from the enclosure 14 that is used to remotely sense the temperature of the environment or of a surface to which it is affixed, via transmission of pressure created by a gas or liquid that partially fills the capillary tube. The capillary tube 22 enters the enclosure and forms a seal at the interface with the enclosure 14. The capillary tube 22 is coupled to components within the known thermostat mechanism 18. The thermostat mechanism 18 also includes a plurality of electrical terminals 24 that protrude from the enclosure 14 and are sealed therewith. The number of electrical terminals 24 varies depending upon the specific type of thermostat mechanism 18 and the specific features provided. The electrical terminals 24 are electrically connected to switch components (not shown) in the thermostat mechanism 18 and provide an electrical and mechanical interface to an external mount or socket.

An adjustment element 26 also protrudes through the enclosure 14 and is sealed therewith. The adjustment element 26 may be a rotary-type shaft configured to interface with biasing elements (not shown) within the thermostat mechanism 18 to provide user control over the temperature set point. The adjustment element 26 also can turn off the thermostat mechanism 18 when fully rotated to one position.

The enclosure 14 is preferably formed of a rigid and durable plastic material. However, any suitable material, such as metal or ceramic may be used. The enclosure 14 essentially forms a seal with the components of the thermostat mechanism 18, such as the capillary tube 22, the electrical terminals 24, and the adjustment element 26.

To operate properly and regulate the temperature accurately, the pressure within the chamber 16 to which the thermostat mechanism 18 is exposed must track its ambient pressure. To equalize the pressure, a venting path must be provided. However, the thermostat assembly 10 is typically placed in the food storage compartment of the refrigerator where explosive gasses may be present. Some known thermostat assemblies could inadvertently expose an explosive gas mixture within the food storage compartment to a spark generated by the thermostat mechanism during normal operation of the thermostat mechanism.

Figure 2:
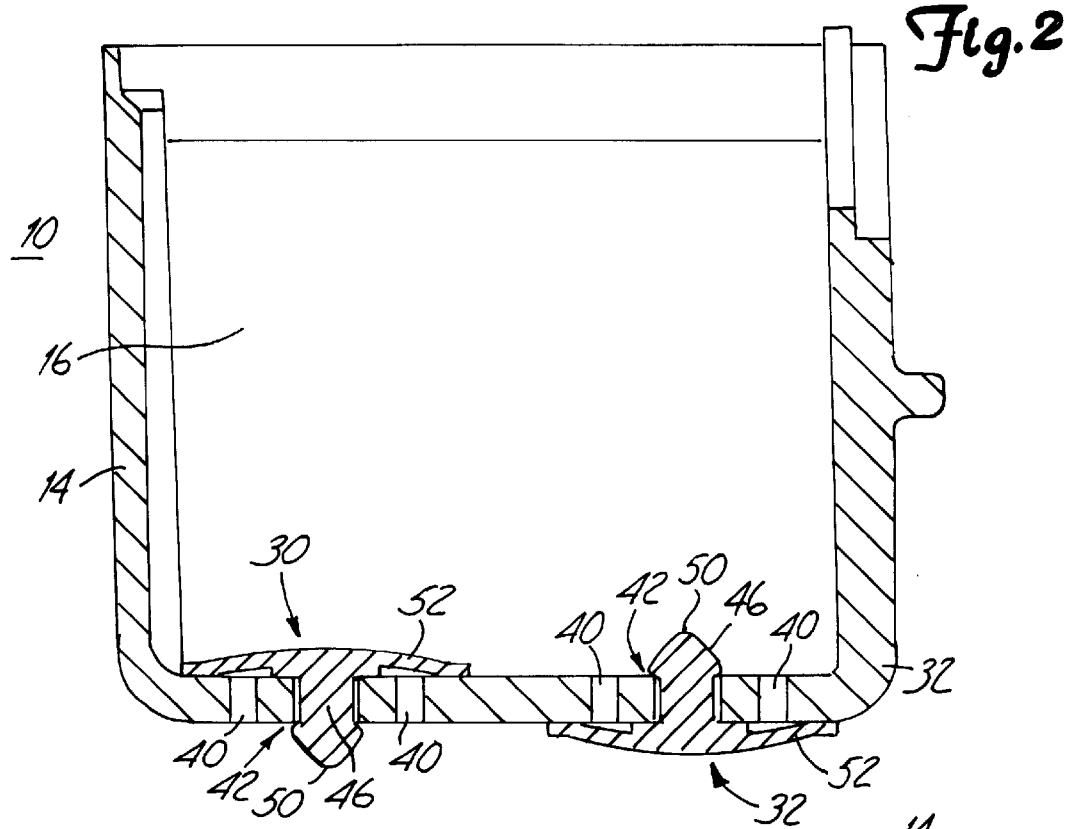
FIG. 2 is a an enlarged partial side view of the enclosure of the thermostat mechanism.
Figure 3:
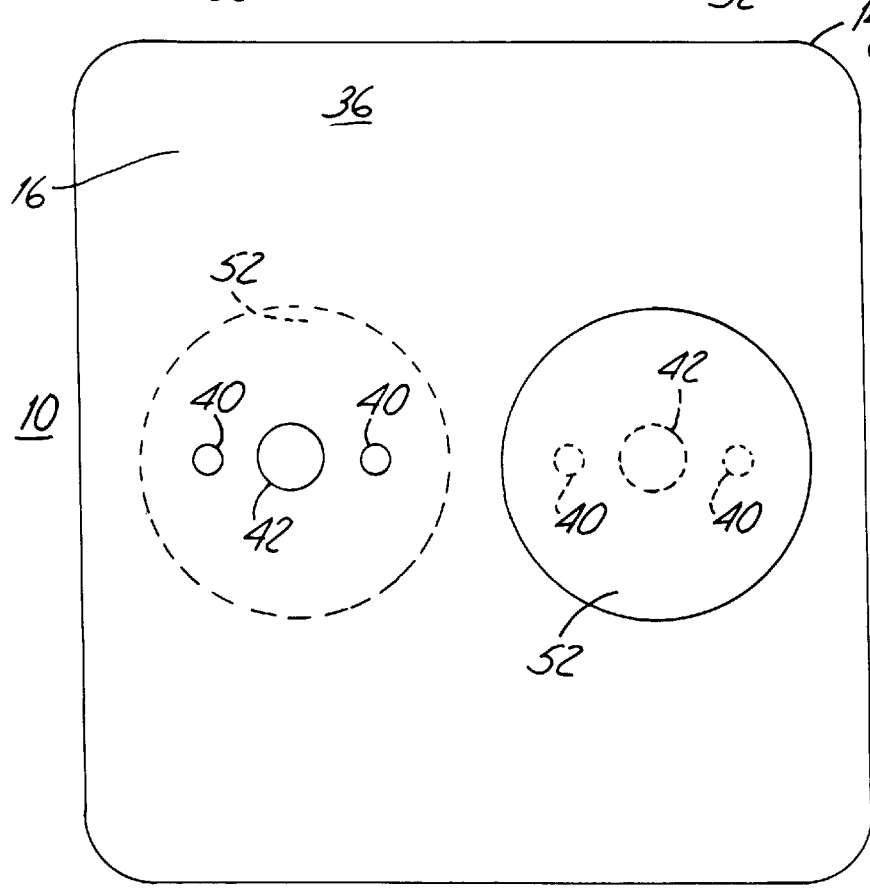
FIG. 3 is an enlarged top view of the enclosure.

Referring now to FIGS. 1–3, FIGS. 2–3 show a portion of the enclosure 14 and a first umbrella-type check valve 30 and a second umbrella-type check valve 32 disposed in a top portion 36 of the enclosure 14. The umbrella-type check valves 30 and 32 may, for example, be manufactured by Vernay Corporation in a variety of sizes and from a variety of materials. Preferably, the umbrella-type check valves 30 and 32 are formed of an elastomeric material, however any suitable material may be used. To prevent a spark generated by the thermostat mechanism 18 from igniting the explosive gas that may be present in the food storage compartment, and to equalize the pressure between the chamber 16 and the food storage compartment, the umbrella-type check valves 30 and 32 permit gas to pass at a controlled rate through vent apertures 40 located on either side of a stem receiving aperture 42 in the enclosure 14. A stem portion 46 of the check valve 30 or 32 is inserted through the stem receiving aperture 42 and forms an interference fit therewith. A flared or bulbous end 50 of the stem portion 46 has a diameter greater than the inside diameter of the stem-receiving aperture 42 and protrudes through the stem-receiving aperture. Because the check valves 30 and 32 are formed of flexible or deformable material, the bulbous end 50 of the stem portion 46 is temporarily compressed as it is received through the stem-receiving aperture 42, and expands once fully inserted through the stem-receiving aperture. This tends to retain the umbrella-type check valves 30 and 32 in place and forms a partial seal with the enclosure 14.

In the normally closed position, a skirt portion 52 of each check valve 30 and 32 covers and blocks the vent apertures 40 so that gas cannot pass through the vent apertures. However, the umbrella-type check valves 30 and 32 are typically formed of pliable rubber or other suitable material and are self-actuating. This means that at a predetermined pressure differential, the skirt 52 will deform temporary, thus unblocking the vent apertures 40 to permit gas to flow therethrough. The first umbrella-type check valve 30 is configured to permit gas to flow into the chamber 16 from the food storage compartment when a low pressure differential between the chamber and the food storage compartment is about 0.1 p.s.i. The second umbrella-type check valve 32 permits gas to flow out of the chamber 16 and into the food storage compartment when a high pressure differential between the chamber and the food storage compartment is about 1.5 p.s.i. It can be seen that operation of the umbrella-type check valves 30 and 32 more easily permit gas to flow into the chamber 16 than out of the chamber.

The umbrella valve 30 can initially be opened manually by lifting the skirt 52 by probing through the vent opening 40. Using this practice, temperature settings can be corrected to the standard barometric pressure to achieve the same result that is achieved with an unsealed thermostat, thereby eliminating temperature setting correlation problems caused by unknown internal pressure within the thermostat enclosure 14.

If the thermostat mechanism 18 within the enclosure 14 is quickly exposed to the ambient pressure that exists within the food storage compartment, as gas may enter the chamber 16 when the pressure differential is only about 0.1 p.s.i. Such approximate equalization in barometric pressure permits accurate temperature calibration and temperature tracking. Generally, barometric-type thermostats are very sensitive to pressure, and the accuracy of such devices may vary as much as one degree Celsius for a temperature rise of five degrees Celsius. Thus, accurate temperature tracking and calibration require that the pressure within the chamber be approximately equal to the pressure within the food storage compartment. A pressure "window" is created which complies with specification IEC 79-15.

Alternately, only the first umbrella-type check valve 30 may be included to permit gas to flow into the chamber. Such an arrangement permits sufficient pressure equalization to insure temperature accuracy of the thermostat mechanism 18 when it is most needed, that is, after the refrigerator has been operating for a sufficient period of time such that the temperature within the food storage area is about equal to the desired temperature. Also, such an arrangement prevents any possible small ignition of explosive gas from escaping from the enclosure 14, because no vent path exists through which the small explosion may exit.

Of course, the umbrella-type check valves 30 and 32 may be replaced with any suitable check valve, such as a duckbill-type valve and the like. Duckbill valves operate in a similar manner as umbrella-type check valves in that both types of check valves permit free flow with positive differential pressure and checked back flow with negative differential pressure.

We claim:

1. An explosion proof refrigeration apparatus containing a thermostat, adapted for use in a food storage compartment, the refrigeration apparatus comprising:

an enclosure forming a chamber configured to house the thermostat;

the enclosure having at least one check valve configured to permit gas to pass into chamber when a predetermined pressure differential exists between the chamber and the food storage compartment; and the enclosure forming a seal with the thermostat so that gas only passes through the at least one check valve.

2. The apparatus according to claim 1 further including a first check valve and a second check valve, the first check valve configured to permit gas to pass into the chamber when a pressure level within the food storage compartment is greater than a pressure level within the chamber by a first predetermined amount, the second check valve configured to permit gas to pass out of the chamber when the pressure level within the food storage compartment is less than a pressure level within the chamber by a second predetermined amount.

3. The apparatus according to claim 1 wherein the at least one check valve is an umbrella-type check valve.

4. The apparatus according to claim 1 wherein the at least one check valve is a duckbill-type check valve.

5. The apparatus according to claim 1 wherein the thermostat includes a plurality of electrical terminals configured to sealingly protrude through a portion of the enclosure so as to maintain the seal between the thermostat and the enclosure.

6. The apparatus according to claim 1 wherein the thermostat includes an adjustment element configured to sealingly protrude through a portion of the enclosure so as to maintain the seal between the thermostat and the enclosure.

7. The apparatus according to claim 2 wherein the first predetermined amount of pressure difference is substantially less than the second predetermined amount of pressure difference.

8. The apparatus according to claim 2 wherein the first predetermined amount of pressure difference is about 0.1 p.s.i, and the second predetermined amount of pressure difference is about 1.5 p.s.i.

9. The apparatus according to claim 2 wherein the value of the second predetermined amount of pressure difference is selected to substantially prevent an ignition of explosive gas within the chamber from exiting the enclosure though the second check valve.

10. An explosion proof refrigeration apparatus containing a thermostat mechanism, the apparatus adapted for use in a food storage compartment, the refrigeration apparatus comprising:

an enclosure forming a chamber configured to house the thermostat mechanism;

first and second check valves disposed in a portion of the enclosure, each check valve partially blocking an aperture formed in the enclosure; and the first check valve configured to permit gas to pass into the chamber when a pressure level within the food storage compartment is greater than a pressure level within the chamber by a first predetermined amount;

the second check valve configured to permit gas to pass into the chamber when a pressure level within the food storage compartment is less than a pressure level within the chamber by a second predetermined amount.

11. The apparatus according to claim 10 wherein at least one of the first and second check valves is an umbrella-type check valve.

12. The apparatus according to claim 10 wherein at least one of the first and second check valves is a duckbill-type check valve.

13. An explosion proof refrigeration apparatus containing a thermostat and adapted for use in a food storage compartment, the refrigeration apparatus comprising:

an enclosure forming a chamber configured to house the thermostat;

means for regulating the passage of gas through an aperture in the enclosure to equalize a pressure differential between the chamber and the food storage compartment; and the enclosure forming a seal with the thermostat so that gas only passes through the means for regulating the passage of gas.

14. The apparatus according to claim 13 wherein the means for regulating passage of gas permits bidirectional venting of gas.

* * * * *